Patented May 4, 1926.

1,583,661

UNITED STATES PATENT OFFICE.

HERBERT EDWIN COCKSEDGE, OF HARTFORD, ENGLAND, ASSIGNOR TO THE SOLVAY PROCESS COMPANY, OF SOLVAY, NEW YORK, A CORPORATION OF NEW YORK.

PROCESS OF FORMING SODIUM COMPOUNDS.

No Drawing. Application filed November 9, 1923. Serial No. 673,827.

*To all whom it may concern:*

Be it known that I, HERBERT EDWIN COCKSEDGE, a subject of the King of Great Britain, residing at Hartford, Chester, in the county of Chester and Kingdom of England, have invented certain new and useful Improvements in Processes of Forming Sodium Compounds, of which the following is a specification.

In an application for Letters Patent of the United States filed by me October 30, 1922, Serial No. 598,020, I have described a new sodium compound which is represented by the formula $$Na_2CO_3.3NaHCO_3$$

and which is characterized by its fine needle-like form and refractive indices of $\alpha$ about 1.435 and $\gamma$ about 1.526.

I have therein described a process for its formation by suitably heating sodium bicarbonate, which should not be absolutely dry but should have some water content. It has also been proposed to make the compound from bicarbonate-carbonate mixtures.

I have now discovered and my new process is based on the discovery that it is not necessary to use the bicarbonate of soda in the formation of the new compound, but that it may be made directly from the carbonate and without any bicarbonate admixture by heating the carbonate in the presence of a carbon dioxide gas, and at a temperature and for a time such that its conversion into sodium bicarbonate is not effected. Water either as liquid or gas should also be present. A temperature of about 75 to 100° C. is suitable, for example, for operations at ordinary pressure.

For example, dry sodium carbonate is heated in a closed vessel at 90° C. to 100° C. while a slow current of a carbon dioxide-water vapor gas mixture (e. g. made by passing carbon dioxide through hot water) is passed through the vessel and in contact with the carbonate.

The gas is in part absorbed and the material in the vessel gradually increases in volume, indicating that the reaction is proceeding. Microscopic examination of the product shows abundance of the thin, elongated, needle-like particles characteristic of the new carbonate-bicarbonate compound. The gas evolved in the production of the new compound from crude bicarbonate as described in my earlier application Serial No. 598,020 contains both $CO_2$ and water vapor and this gas can be used in the production of the compound from sodium carbonate. Accordingly, my two processes are supplementary one to the other in that the gaseous by-product from the process of my earlier application may be used as the source of the $CO_2$ and water, or water vapor, for the process which is the subject of this application.

When in the claims I speak of the compound $$Na_2CO_3.3NaHCO_3$$

I mean the substance as described in my earlier application which is characterized by its fine needle-like crystal form and the refractive indices of $\alpha$ about 1.435 and $\gamma$ about 1.526 and when in the claims I use the phrase "carbonate of sodium material containing less $CO_2$ than $$Na_2CO_3.3NaHCO_3\text{''}$$

the comparison is between equal quantities by weight of the "material" and of the $$Na_2CO_3.3NaHCO_3$$

and obviously the expression "carbonate of sodium material" includes not only a dry sodium carbonate, but also mixtures of the carbonate with other materials including, of course, such a material when already containing some of the new compounds and/or even some bicarbonate.

What I claim as new and desire to secure by Letters Patent is:—

1. The process which comprises treating carbonate of sodium material containing less $CO_2$ than $$Na_2CO_3.3NaHCO_3$$

which comprises the incorporation of a limited amount of $CO_2$ in said material until substantial amounts of $$Na_2CO_3.3NaHCO_3$$

are produced free from dominant amounts of bicarbonate or of a carbonate-bicarbonate mixture.

2. The process of forming the substance $$Na_2CO_3.3NaHCO_3$$

which comprises exposing a given amount of carbonate of sodium material containing less $CO_2$ than $$Na_2CO_3 \cdot 3NaHCO_3$$

to an atmosphere containing carbon dioxid and $H_2O$ and maintaining said material in said atmosphere at a temperature below that which cause carbonate of sodium to refrain from reaction with $CO_2$ or which would convert the material into carbonate, until the compound $$Na_2CO_3 \cdot 3NaHCO_3$$

begins to be formed in substantial amounts and thereafter maintaining the conditions thus established, whereby the sodium carbonate-bicarbonate compound $$Na_2CO_3 \cdot 3NaHCO_3$$

as distinguished from bicarbonate alone or a carbonate-bicarbonate mixture is produced.

3. The process of forming the substance $$Na_2CO_3 \cdot 3NaHCO_3$$

which comprises heating sodium carbonate at a temperature of about 100° C. in the presence of carbon dioxide and water (and under conditions of treatment favorable to the formation of said compound).

4. The process of forming the substance $$Na_2CO_3 \cdot 3NaHCO_3$$

which comprises driving off from crude bicarbonate material by moderate heat, less than that which would convert the material into carbonate, limited amounts of $CO_2$ and $H_2O$ until the compound $$Na_2CO_3 \cdot 3NaHCO_3$$

is formed in substantial amounts and leading the gases from said reaction into contact with carbonate of sodium material containing less $CO_2$ than $$Na_2CO_3 \cdot 3NaHCO_3$$

and exposing a given amount of the carbonate material to said atmosphere and maintaining it therein until the compound $$Na_2CO_3 \cdot 3NaHCO_3$$

is formed in substantial amounts and thereafter maintaining the conditions thus established, whereby the sodium carbonate-bicarbonate compound $$Na_2CO_3 \cdot 3NaHCO_3$$

as distinguished from bicarbonate alone or a carbonate-bicarbonate mixture is produced as the result of the conversion of both the bicarbonate as well as the carbonate material into the compound having the formula set forth.

In testimony whereof I affix my signature, this 23rd day of October, 1923.

HERBERT EDWIN COCKSEDGE.